United States Patent [19]

King et al.

[11] Patent Number: 5,021,772
[45] Date of Patent: Jun. 4, 1991

[54] INTERACTIVE REAL-TIME VIDEO PROCESSOR WITH ZOOM PAN AND SCROLL CAPABILITY

[76] Inventors: Stephen J. King, 60 Spencer Ave., Toronto, Canada, M6K 2J6; Lochlan E. Magee, 4174 Wheelwright Crescent, Mississauga, Canada

[21] Appl. No.: 462,868

[22] Filed: Oct. 5, 1989

Related U.S. Application Data

[63] Continuation of Ser. No. 78,897, Jul. 29, 1987, abandoned.

[30] Foreign Application Priority Data

Nov. 20, 1986 [CA] Canada ..................... 523500

[51] Int. Cl.⁵ ............................... H04N 9/535
[52] U.S. Cl. .................... 340/724; 340/726
[58] Field of Search ........... 340/723, 703, 724, 747, 340/744, 791, 793, 799, 726; 358/22, 180

[56] References Cited

U.S. PATENT DOCUMENTS

| | | | |
|---|---|---|---|
| 4,258,385 | 3/1981 | Greenberg et al. | 358/22 |
| 4,484,187 | 11/1984 | Brown et al. | 340/724 |
| 4,490,797 | 12/1984 | Staggs et al. | 340/721 |
| 4,528,585 | 7/1985 | Bolger | 358/22 |
| 4,673,929 | 6/1987 | Nelson et al. | 340/703 |

FOREIGN PATENT DOCUMENTS

0143485 1/1987 Japan .

OTHER PUBLICATIONS

Artwick, "Microcomputers Displays, Graphics, and Animation", Prentice-Hall, New Jersey, pp. 290-291.

*Primary Examiner*—Alvin Oberley

[57] ABSTRACT

A video processor used in conjunction with commercial video products provides realistic visual imagery and a dynamic interactive capability. The outputs from three video digitizers, one for each of the primary colours red, green and blue (RGB) of a composite video signal, are stored in high speed, serial access memory devices. The output of the memory devices is converted to an analog signal for an ordinary RGB monitor. Image content can be transformed in real-time via microprocessor control of selected data in the memory devices, encoding and retrieval circuits permitting a portion of the original video signal to completely fill a normal RGB monitor. As well, computer generated imagery can be superimposed upon the video background and the background can be altered to achieve special visual effects.

17 Claims, 4 Drawing Sheets

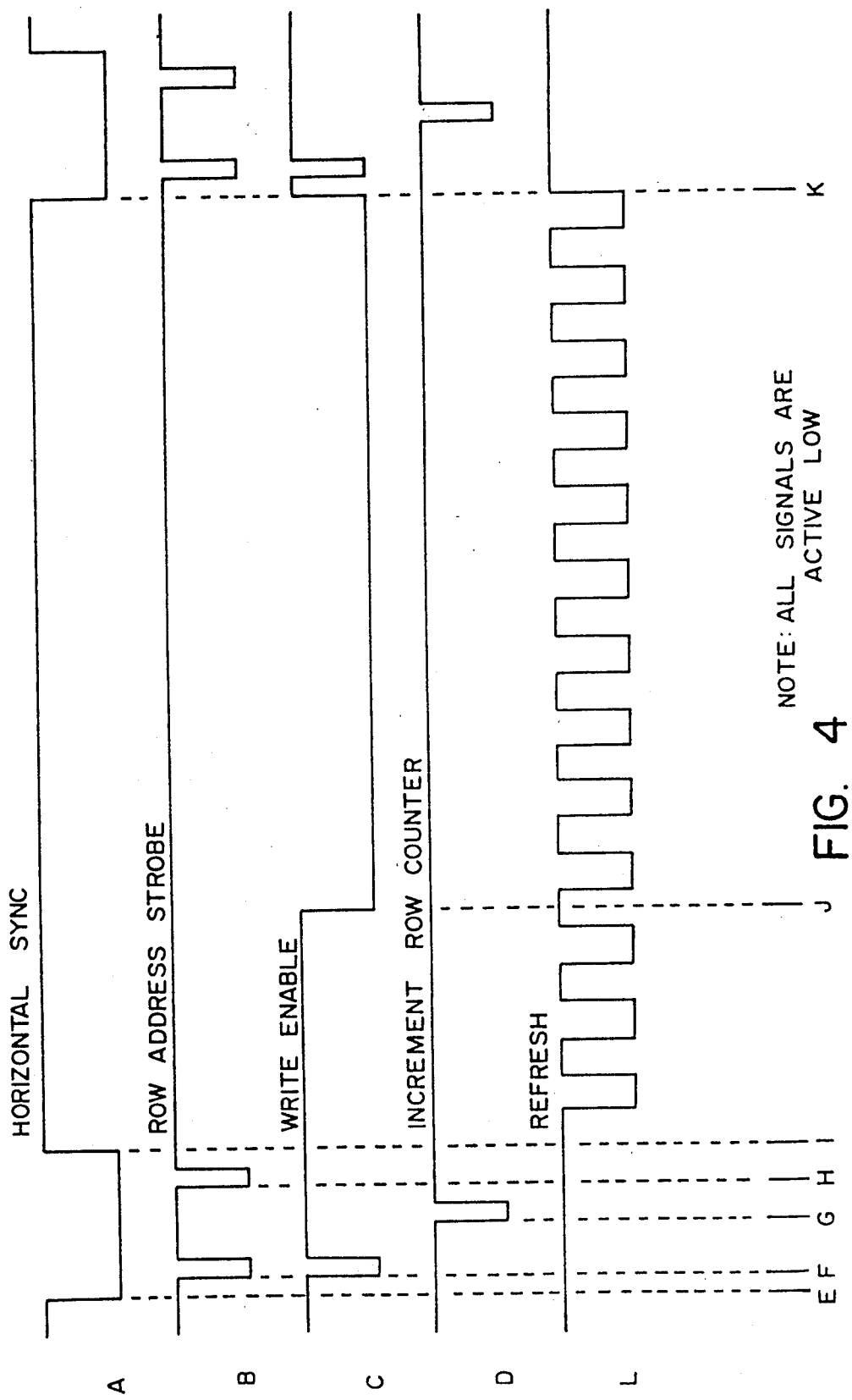

INTERACTIVE REAL-TIME VIDEO PROCESSOR WITH ZOOM PAN AND SCROLL CAPABILITY

This application is a continuation of application Ser. No. 07/078,897, filed Jul. 29, 1987, now abandoned.

FIELD OF THE INVENTION

This invention relates to a video processor capable of providing a dynamic interactive capability.

BACKGROUND OF INVENTION

Training simulators are frequently used to provide realistic training of complex skills. One advantage of a training simulator over real equipment is that it can provide training more cost-effectively. Since visual information is often necessary to guide learned behaviour, an interactive visual system is needed to supply environmental cues. However, the visual system of a training simulator is usually its most expensive component. Low cost solutions are thus needed to improve cost-effectiveness.

An alternative to systems currently in widespread use is an interactive, videodisc-based visual system which can provide realistic backgrounds and afford a limited amount of dynamic interaction with previously recorded scenes. In order to allow effective training of visual-motor skills, it is necessary that the visual system be capable of responding to this interaction in real-time. Also, it is sometimes necessary to provide additional, dynamic visual information to supplement recorded training materials. This is required because it is not always possible to anticipate fully the temporal and spatial occurrence of a visual event, or its exact visual characteristics.

One solution is to combine low-cost imagery generated by computer with video recordings. When necessary, the computer generated imagery is superimposed upon, or keyed over, the prerecorded background. A system of this type is appropriate to the design of training simulators meant to assist the learning of tasks which rely on visual depictions, the area in which visual changes occur being limited and not requiring detailed imagery to be produced continuously. There is a fairly large range of military tasks in need of training which meet these requirements. For example, in training tank gunnery the target is the focus of attention and little computer-generated imagery needs to be used to simulate the trajectory and fall of shot. However, it is often very expensive to train personnel for these tasks, and accordingly the system is particularly appropriate for such training purposes. Such a system could also easily be adapted for entertainment purposes, in a wide variety of arcade games.

SUMMARY OF THE INVENTION

The invention herein described was developed to provide, at low cost, an interactive video processor which can supply realistic visual imagery when used in conjunction with commercial video products. A unique feature of the video processor is its ability to allow zoom, pan and scroll of video frames (i.e., those encoded in NTSC format) in real time (ie, at rates equal to 30 frames per second). Another important characteristic of the system is that it allows the video image to be transformed in a number of ways. Meteorological models can be used to simulate fog, for instance.

The present invention enables NTSC video signals to be transformed in a number of ways, thereby enabling these signals to be used as visual imagery for interactive training simulators or arcade games. More specifically, the outputs of analog to digital converters which have transformed the signals coming from a composite video decoder into computer-acceptable code are stored in, and retrieved from, high speed serial access memory devices in such a way as to zoom the image and permit pan and scroll of the video image in real time. The output of the system is fed to digital to analog devices which encode the signals for display on a commercial (RGB) monitor. A joystick, or other displacement type input device, coupled to a microprocessor, can be used to select image content. In addition, imagery generated by computer software may be written into display memory, thereby allowing this imagery to be superimposed upon the video background. In this way, special visual effects can be created.

More particularly, the present invention relates to an interactive video processor, comprising analog-to-digital conversion means for converting an input analog video signal into sequential digital data; storage means for storing the sequential digital data from the conversion means; processing means for retrieving the digital data from the storage means and selectively changing the digital data; and conversion means for converting the digital data into an output analog signal.

BRIEF DESCRIPTION OF THE DRAWINGS

A preferred embodiment of the present invention will be described in conjunction with the attached drawings, in which:

FIG. 4 is a timing diagram used in describing the operation of the invention.

DESCRIPTION OF THE PREFERRED EMBODIMENT

A preferred embodiment of the present invention will now be described in detail.

Figure 1:
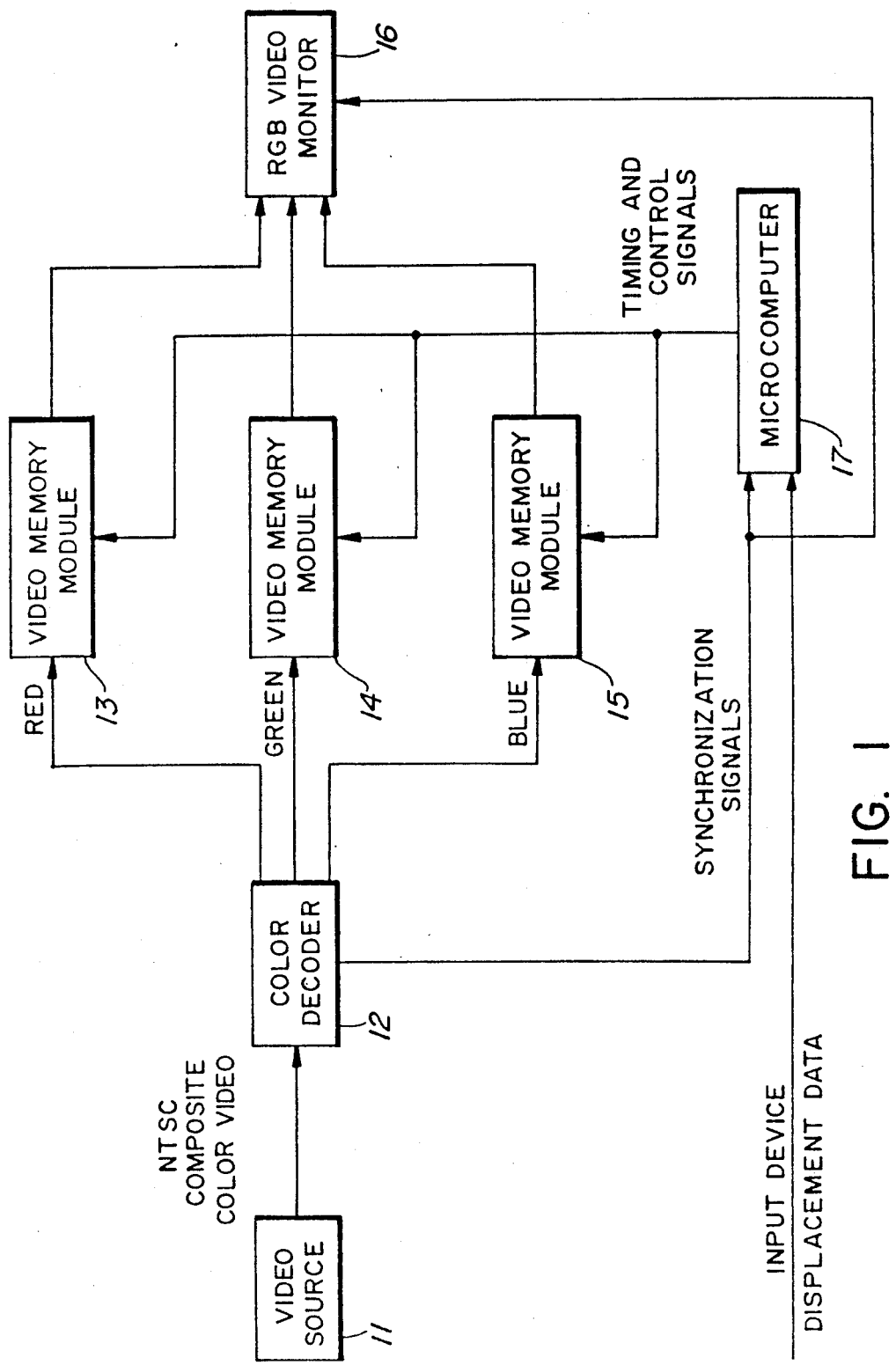
FIG. 1 is a block diagram of the preferred embodiment of the invention.

As shown in FIG. 1, the preferred embodiment of the invention contains a non-specific source of composite colour video signals at 11. This source could be a radio frequency tuner for the reception of commercial television broadcasts, a videocassette machine for using previously recorded material, a television camera for using live video, or a standard industrial videodisc player. The output of the video signal source is fed directly to the input of a composite colour decoder 12. Decoder 12 can be a commercially available unit, such as a model ECP-1000 NTSC decoder manufactured by Electrohome Limited. The output of decoder 12 consists of separate red, green, and blue (RGB) video signals and a composite video synchronization signal. The RGB outputs are fed to memory modules (video frame stores) 13, 14 and 15, one module for each colour. Under program control, a microcomputer 17 takes input device displacement data and uses these data to generate pan and scroll instructions for memory modules 13, 14 and 15. Microcomputer 17 is also responsible for the generation and motion of artificial imagery. Microcomputer 17 incorporates all the necessary signals for refreshing the dynamic memory devices used in modules 13, 14 and 15, and it orchestrates the storage and retrieval of data among the banks of memory devices. In each of memory modules 13, 14 and 15, there are four memory banks. These are organized so that each bank contains a digital representation of one of the two fields of a video frame, one frame being stored while the other frame is displayed. The outputs from memory modules 13, 14 and 15 are the analog RGB signals necessary to drive a colour monitor 16.

Figure 2:
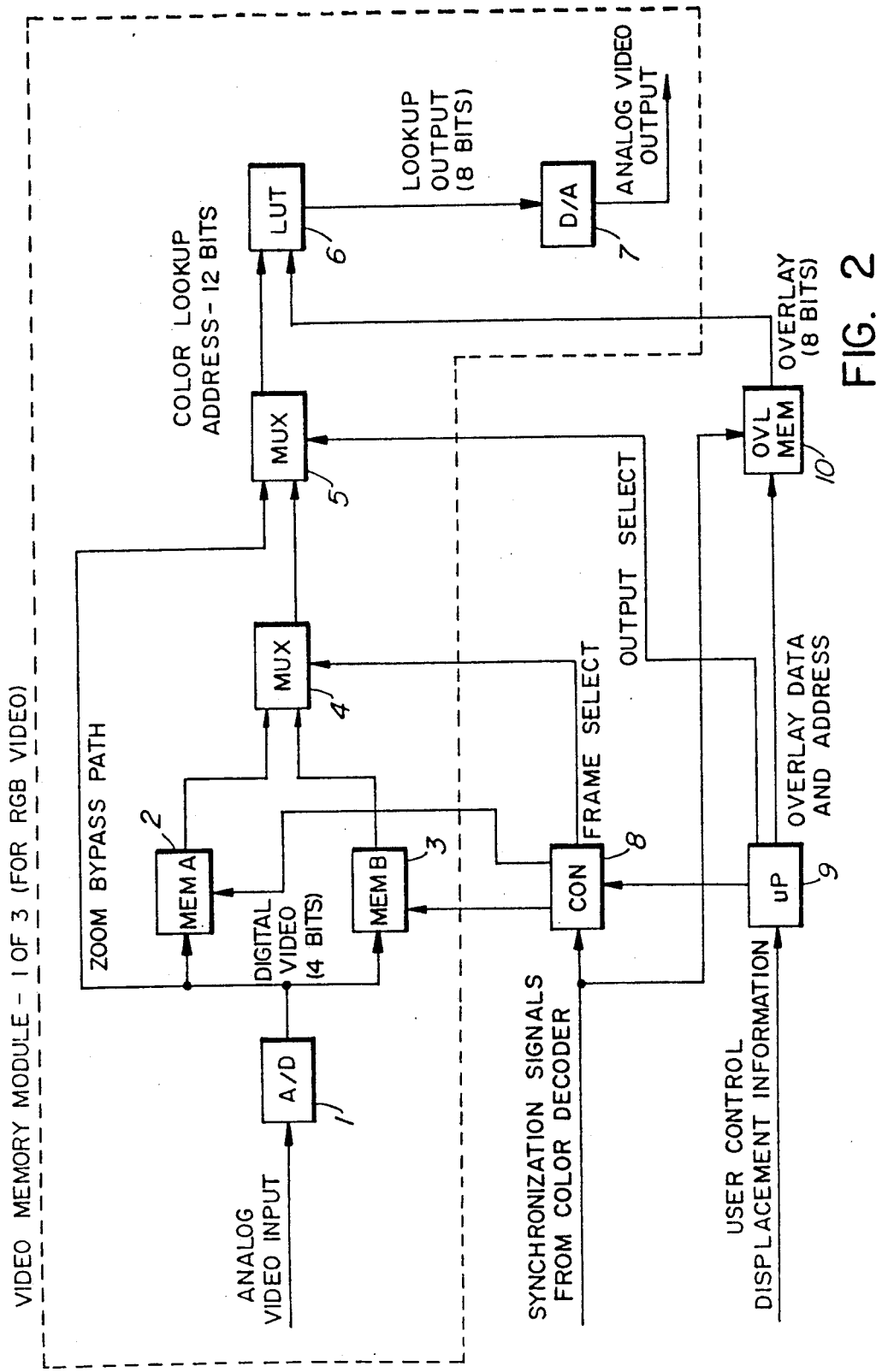
FIG. 2 is a block diagram of the microcomputer and memory modules of FIG. 1.

FIG. 2 shows a more detailed view of the memory modules, and depicts the constituent parts of microcomputer 17: a microprocessor 9, a video overlay (OVL) memory 10; and a timing and control (CON) section 8. Since memory modules 13, 14 and 15 are identical in design and function, only one has been illustrated here.

Analog video from decoder 12 is digitized by an analog-to-digital (A/D) converter 1. Means for adjusting the gain and input offset of converter 1 are provided by additional circuitry associated with converter 1. In the illustrated embodiment, this circuitry is incorporated into the converter by a commercially available circuit card, the VAF-512 circuit card from Matrox Electronic Systems Inc. The output of converter 1 is four bits of digital data which represent the instantaneous amplitude (intensity) of the video signal being processed. These data pass to the video frame memory (MEM) modules 2 and 3. Timing and control circuit 8 alternately enables storage of digitized video frames in memory modules 2 and 3.

Timing and control circuit 8 also enables retrieval of information from memory modules 2 and 3 via multiplexer 4, so that when one memory module is storing data, multiplexer 4 is obtaining data from the other module. This approach, called 'double buffering', operates in a continuous fashion, so that input video data are always being stored in one of the memory banks. Double buffering provides the means by which real time zooming of the image may be accomplished. Timing and control circuit 8 co-ordinates the process. Storing of the input data is delayed relative to the start of each video scan line by an amount of time appropriate to achieve the desired horizontal displacement (pan) of the output image. Vertical displacement (scroll) of the video image is achieved by initiating data retrieval at a memory address appropriate to the video line which is to appear at the top of the visual display. The rate at which information is retrieved from memory is one half that of the rate of storage. Thus the width of the pixels in the transformed image is doubled. Similarly, each of the original video scan lines is displayed twice, once in each field of the transformed frame, doubling the effective height of the pixels. The combination of pan, scroll, pixel rate and scan line replication is thus seen to result in a video signal which effectively magnifies the original by two. Timing and control section 8 ensures that the process retains synchronization with the video from source 11.

The output from multiplexer 4 is fed to the input of multiplexer 5. This allows microprocessor 17, and ultimately the user, to select either a zoomed view, by way of the switched frame memories 2 and 3, or an unzoomed (normal) view, by way of the bypass path from A/D converter 1.

The output of multiplexer 5 is used by colour lookup tables (LUT) 6 as the four least significant bits of a 12 bit address. The remaining 8 bits are provided by overlay memory 10. These higher order bits come from locations in overlay memory 10 whose contents are determined dynamically by the output of microprocessor 17. Overlay memory 10 can consist of such commercially available components as a pair of RGB-512 video boards from Matrox Electronic System Inc. One of the overlay boards may be used for creating visual effects such as smoke, or dust, while the other may be used to overlay graphics. These effects are accomplished by careful selection of the data loaded into the lookup tables 6. With no visual effects (i.e., no overlay data), the four bit output from multiplexer 5 is used to address one of the bottom sixteen locations of lookup table 6. Data bits from overlay memory 10 cause other colour sets to be addressed in lookup table 6. Since the output of each RGB-512 board is four bits, one of sixteen different colour maps may be chosen, depending on the value stored in overlay memory 10 by microprocessor 9. For example, the values stored in the lowest sixteen locations of lookup table 6 could represent the full brightness range for the colour concerned. Successively higher sets of sixteen locations, accessed by successively higher values for the overlay bits, could contain values which result in reduced contrast and brightness, giving the effect of visual translucence. The second overlay memory card can be used for generating graphics which totally obscure the video background. The four data bits from this board permit addressing sixteen blocks of 256 colour value locations. If these bits are all zero, a normal or partially obscured video picture is seen. If any one of these bits is set, the colour map switches, so that a new set of colour values is accessed. These colour values differ for each memory module 13, 14 and 15, so that the result is a solid colour overlay, the colour dependent on the value stored in overlay memory.

From the lookup tables 6, eight bits of intensity data are passed to the digital-to-analog (D/A) converter 7. D/A converter 7 can also reside on the Matrox VAF-512 circuit board. D/A converter 7 takes the eight bit data from lookup table 6 and converts it to a linear voltage which drives RGB video monitor 16.

Figure 3:
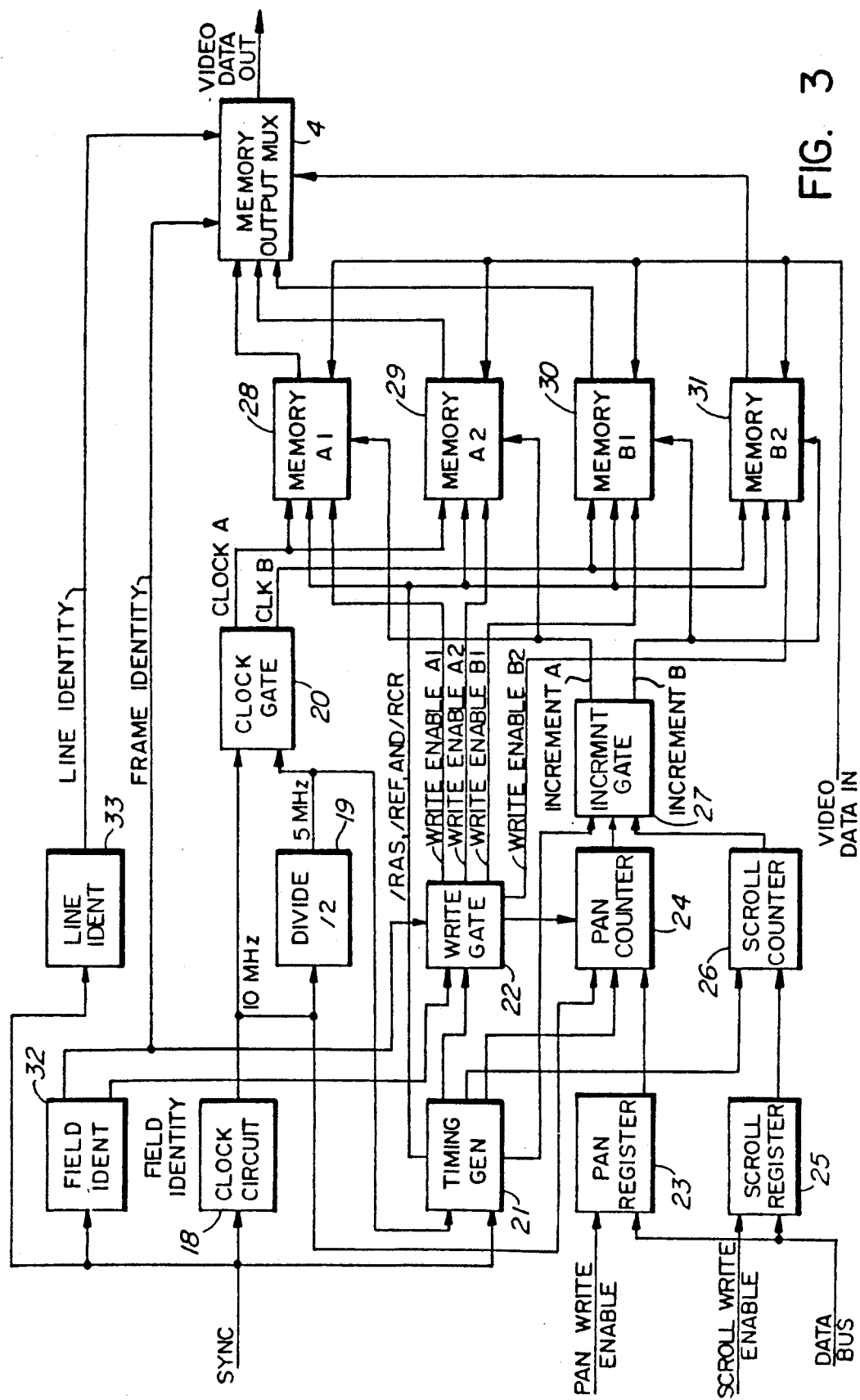
FIG. 3 is a block diagram of the timing and control section of FIG. 2.

A more detailed account of control flow is shown in FIG. 3. Video sync signals are used to phase-lock the master 10 MHz clock by a clock circuit 18. Clock circuit 18 resides on one of the aforementioned Matrox VAF-512 circuit boards. This phase-lock is necessary to ensure that pixels are not shifted laterally from line to line, that is, to ensure that the first pixel in each line is directly beneath the first pixel on the line above. The output of clock circuit 18 feeds into a clock gate 20, a divide-by-two circuit 19, and a pan counter 24. The output of divide-by-two circuit 19 also feeds into clock gate 20, as well as into a timing generator 21. Clock gate 20 determines which timing signal (5 MHz from divider 19 or 10 MHz from clock circuit 18) reaches which memory buffer (A, 28 and 29 or B, 30 and 31). The 10 MHz signal is used to clock a selected memory buffer when video data are being written into it from A/D converter 1, while the 5 MHz clock is used for reading video data from that buffer. Since the clock rates differ by a factor of two, output pixels will be twice as wide as input pixels. This width factor is essential to the proper operation of the zoom function. The sync signals are also used by a field identifier circuit 32 and a line identifier circuit 33. Field identifier 32 is essentially a pair of flip-flops chained into a divide-by-four circuit. Vertical sync clocks the circuit so that a state change occurs on the outputs at the end of each display field. These state changes are cyclical in nature, with the field identify output changing once per vertical (field) interval, and the frame identify output changing once for every two vertical intervals (fields). Both frame and field identity are passed to a write gate circuit 22 to specify the next memory bank to store data. Frame identity is passed to memory output multiplexer 4, to select data from the appropriate memory module. Line circuit 33 generates the line identity from the horizontal sync pulses. This identity is passed to memory output MUX 4. During one display field of a zoomed image, consecutive display lines must come from alternate memory fields in the same frame. This is necessary due to the interlaced nature of NTSC television pictures, and is accounted for by the application of the line identity signal which changes state once for each output display line and thus has a frequency which is one half of the fundamental horizontal scanning frequency.

Synchronization signals are also fed to master timing generator 21. Timing generator 21 is responsible for the production of the various timing and control signals needed by the NEC serial access memory devices herewith used (NEC UPD41221C). In order to clarify the function of these control and timing signals, a brief description of the memory devices will now be given.

As in regular dynamic RAM (random access memory), the internal
structure of the uPD41221C is a rectangular array of storage cells (320 rows by 700 columns). However, unlike regular RAM, these devices contain an internal shift register into which an entire row (700 individual locations) can be loaded by the /RAS (row address strobe) signal. Data can be transferred from the shift register to memory by having /RAS and /WE (write enable) active (low) at the same time. A stream of single bits, as appears on a single output line from the A/D converter 1 during the digitization of a video scan line, can be clocked into the shift register by the serial clock (/SC) when /WE is active. If /WE is high (inactive), /SC will clock the data out of the shift register through the data out (Dout) connection to the external circuitry. These RAM devices also differ from usual devices in that there are no address lines into the package. Instead, an internal row counter keeps track of which row in the memory array of the device will be accessed next. Separate connections are provided for resetting(/RCR —row counter reset), incrementing (/INC —increment row counter), and decrementing (/DEC —decrement row counter) the internal pointer to the selected row in the internal memory array. The external control circuitry must also provide a periodic refresh signal (/REF) to ensure that the individual memory cells retain their data. Referring again to FIG. 3, it can be seen that timing generator 21 is responsible for /RAS, /REF and /RCR. These control signals are common to all memory banks, as the output video is in sync with the input. The microprocessor data bus connects to a pan register 23 and a scroll register 25. Displacement data are transferred to these registers from the bus when the appropriate write enable line is active. Timing generator 21 transfers the data from the registers to the counters (pan 24 and scroll 26) during the vertical sync interval for scroll, before the next field is captured, and during horizontal sync for pan, before the line is captured. The output of pan counter 24 serves to delay write enable and the serial clock to the memory bank currently being used for capture. Scroll counter 26 is used to increment the row counter of the display (output) memory banks during the vertical sync interval until the desired scroll value is reached. Increment gate 27 determines which memory bank receives the scroll signals and suppresses alternate increment pulses during the display cycle, as previously described.

The timing relationships between the control signals is depicted in FIG. 4. Line A represents the horizontal sync signal (HSYNC). The display is blanked when HSYNC is low; during this state transfer between internal memory rows and the internal shift register takes place. Starting at time E, HSYNC goes low and there is a brief pause to allow settling before time F. To write to memory, both /RAS (B) and /WE (C) go low at time F, storing the contents of the shift register in the internal memory row. There is another brief pause before /INC (D) becomes active, incrementing the row counter to point to the next internal memory row (time G). After another short delay (H), /RAS again becomes active. On data capture, this has no significant effect, but on display the contents of the memory row are transferred to the output shift register. At time I HSYNC is no longer active and the pan counter begins to count down from the value loaded from register 23. The count is reached by time J when /WE once again becomes active for the memory bank currently capturing data. Time K is the start of the next horizontal sync pulse, and all control lines become inactive at this time, in order to prepare for the HSYNC timing cycle. The signals are similar for the case of a memory bank being accessed for display, except that there is no write signal activity between HSYNC pulses. Also, /INC is only active on alternate HSYNC pulses, as previously mentioned. Note that signal L, the refresh signal, is only active between HSYNC pulses.

From the foregoing, it is evident that there are a number of ways of generating the necessary timing and control signals. The method used in the present implementation is that of a state-driven system comprising decoding circuitry driven by counters running off the 10 MHz clock; sync pulses from the NTSC decoder are used to reset these counters, keeping the control state locked to the incoming video. Variations of the particular embodiment herewith described will be obvious to one skilled in the art, and accordingly the embodiment is to be taken as illustrative rather than limitative, the true scope of the invention being set out in the appended claims.

The embodiments of the invention in which an exclusive property or privilege is claimed are defined as follows:

1. In an interactive video processor for processing image data corresponding to video scan lines derived form scanning an image, said processor comprising:
   sampling means for sampling the image data,
   storing means for storing the sampled image data, at a given rate of storage, in successive memory addresses of said storing means,
   retrieving means for retrieving the stored image data,
   processing means for processing the retrieved image data, and
   display means for displaying the image originally scanned;
   the improvement comprising pan circuit means for delaying the storage of the sampled image data relative to the start of each video scan line by an amount of time appropriate to achieve a desired horizontal displacement of the displayed image, and scroll circuit means for initiating data retrieval at a memory address appropriate to the video scan line which is to appear at the top of the display of the image so as to achieve vertical displacement of the displayed image; and wherein said retrieving means retrieves the image data at a rate equal to a predetermined fraction of the rate of storage of the image data, and said display means displays the image data corresponding to each video scan line twice so as to produce a display of the image which is effectively magnified by a predetermined factor.

2. In the processor of claim 1, further comprising selecting means responsive to an operator selection input for selecting the magnified image or an unmagnified image for display.

3. In the processor of claim 1, wherein said storing means comprises two memory modules and data entry means for storing the sampled image data into alternative ones of said memory modules during successive data entry cycles, said retrieving means simultaneously retrieving the image data from said memory module other than said memory module in which the image data are being stored during the successive data entry cycles.

4. In the processor of claim 1, further comprising additional memory means for storing other data, said processing means combining the image data retrieved from said storing means with the other data.

5. In the processor of claim 1, further comprising additional processing means for modifying the other data stored in additional memory means.

6. In the processor of claim 1, further comprising a composite colour decoder including an input access for a video signal source and an output access for each primary colour signal, said output access providing a signal comprising the image data sampled by said sampling means.

7. In the processor of claim 1, further comprising colour look-up table means for selectively changing the outcome of combinations of the image data from said storing means with the other data.

8. In the processor of claim 1, wherein the image data are provided to said sampling means by a videodisc player.

9. In the processor of claim 1, wherein the image data are provided to said sampling means by a videocassette recorder.

10. In the processor of claim 1, wherein the image data are provided to said sampling means by a radio frequency tuner.

11. In the processor of claim 1, wherein said pan circuit means comprises a pan register for receiving horizontal displacement data and a pan counter connected to said pan register for receiving the horizontal displacement data from said pan register.

12. In the processor of claim 11, wherein said scroll circuit means comprises a scroll register for receiving vertical displacement data and a scroll counter connected to said scroll register for receiving the vertical displacement data from said scroll register.

13. In the processor of claim 12, wherein said scroll counter produces a counter output, and wherein said storing means comprises a row counter, and further comprising increment gate means connected between said scroll counter and said storing means and responsive to said counter output for incrementing the row counter of said storing means during a vertical sync interval of said display means until a desired scroll value is reached as indicated by the counter output of said scroll counter.

14. In the processor of claim 13, wherein said storing means receives a write enable signal and a serial clock signal, and wherein said pan counter delays reception of the write enable signal and the serial clock signal by said storing means.

15. In the processor of claim 2, wherein said storing means receives a write enable signal and a serial clock signal, and wherein said pan counter delays reception of the write enable signal and the serial clock signal by said storing means.

16. In the processor of claim 11, wherein said storing means receives a write enable signal and a serial clock signal, and wherein said pan counter delays reception of the write enable signal and the serial clock signal by said storing means.

17. In the processor of claim 11, wherein said scroll counter produces a counter output, and wherein said storing means comprises a row counter, and further comprising increment gate means connected between said scroll counter and said storing means and responsive to said counter output for incrementing the row counter of said storing means during a vertical sync interval of said display means until a desired scroll value is reached as indicated by the counter output of said scroll counter.

* * * * *